No. 606,645. Patented July 5, 1898.
J. A. COSTELLO.
NUT TAPPING MACHINE.
(Application filed Oct. 25, 1897.)
(No Model.)
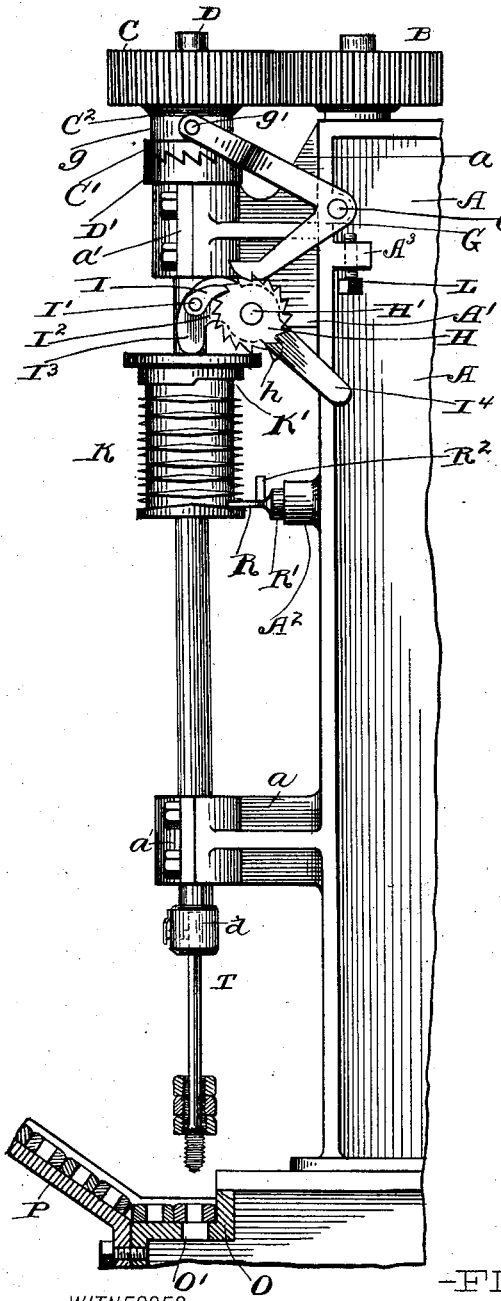
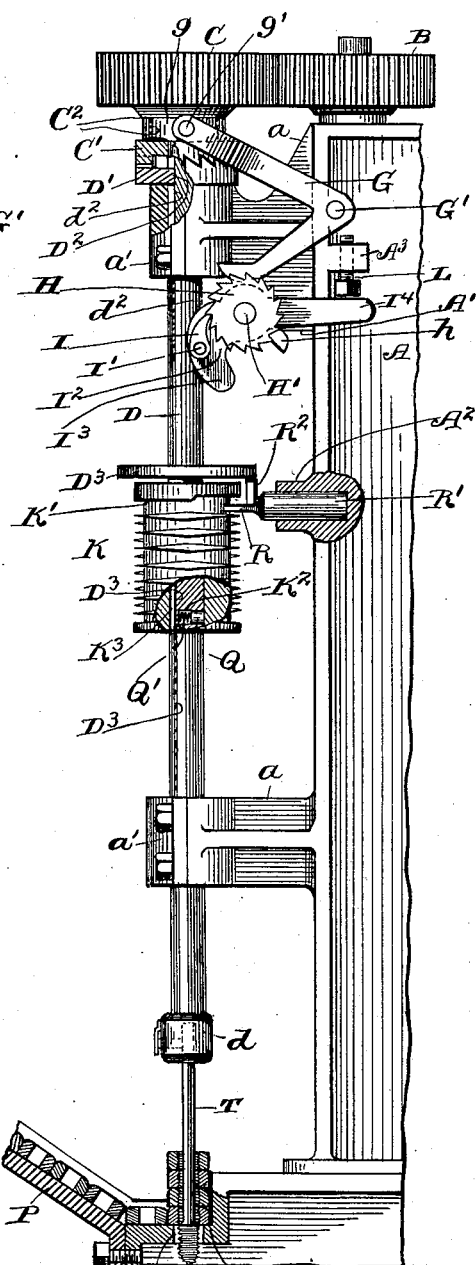
WITNESSES
Daniel E. Daly
Ella E. Tilden
INVENTOR
Joseph A. Costello
BY
Lynch, Dover & Donnelly
his ATTORNEYS.
THE NORRIS PETERS CO., PHOTO-LITHO., WASHINGTON, D. C.

UNITED STATES PATENT OFFICE.

JOSEPH A. COSTELLO, OF CLEVELAND, OHIO.

NUT-TAPPING MACHINE.

SPECIFICATION forming part of Letters Patent No. 606,645, dated July 5, 1898.

Application filed October 25, 1897. Serial No. 656,336. (No model.)

*To all whom it may concern:*

Be it known that I, JOSEPH A. COSTELLO, of Cleveland, Cuyahoga county, Ohio, have invented certain new and useful Improvements in Nut-Tapping Machines; and I do hereby declare the following to be a full, clear, and exact description of the invention, such as will enable others skilled in the art to which it pertains to make and use the same.

My invention relates to improvements in nut-tapping machines.

The object of the invention is to construct a machine that is simple, convenient, durable, and reliable.

With this object in view and to the end of rendering the machine simple and durable the invention consists in certain features of construction and combinations of parts hereinafter described, and pointed out in the claims.

In the accompanying drawings, Figures I and II are side elevations, partly in section, of a machine embodying my invention. Fig. III is a transverse section.

Referring to the drawings, A designates an upright standard that at its upper end bears a horizontally-arranged suitably-operated pinion B, that is driven continuously in one direction in any approved manner. Pinion B meshes with a horizontally-arranged gear C, that is loosely mounted upon the upper end of a vertically-arranged spindle D. Spindle D has bearing in boxes $a'$ $a'$, that are rigid with arms $a$, that project laterally from and are integral with standard A. The upper box $a'$ is arranged near the upper end of the standard, a short distance below pinion C. Spindle D at its lower end is provided with a tap-holder $d$, to which the tap T is secured in any approved manner. A clutch for controlling operative connection between gear C and the spindle D is provided. One member C' of the said clutch is rigid or integral with the gear, and the companion clutch member D' is operatively and slidably mounted upon the spindle, and operative connection between the said last-mentioned clutch member and spindle is formed, preferably, by the well-known means of groove $d^2$ and feather $D^2$. The said feather is fixed to the clutch member D' and engages the said groove, that is formed in the spindle and is long enough to accommodate the endwise movement of the spindle during the operation of the machine. An annular groove $C^2$ is formed upon the part that forms gear C and clutch member C' and is occupied by a ring or collar $g$, that is not rotatable with the said part, and is provided with a laterally-projecting pin or arm $g'$, that is operatively engaged by one of the arms of the bell-crank lever G, that is horizontally fulcrumed or pivoted, as at G', to standard A, and has its other arm arranged to be engaged by the projecting arm or member $h$ of a ratchet-wheel H, that is pivoted horizontally, as at H', to a lug or arm A', formed upon standard A. Member $h$ projects beyond the periphery of the ratchet-wheel and is arranged at one side of the teeth of the said wheel and of course in position to engage and actuate the lever once in every complete rotation of the ratchet-wheel. The ratchet-wheel is engaged by a pawl I, that is horizontally pivoted, as at I', to a lever $I^2$, that is loosely mounted or journaled upon the axial pin or bearing of the ratchet-wheel and extends into close proximity to spindle D, and extends also below the pawl, as at $I^3$, and has its said portion $I^3$ arranged to be engaged and elevated by a collar or shoulder $D^3$, formed externally of the spindle, when the spindle is elevated after having tapped a nut and preparatory to the descent of the tap into engagement with the next nut that is to be tapped. The shank of the tap is long enough to render it capable of holding several tapped nuts. The spindle is moved endwise by a double-feed screw K and by the engagement of the threads of the tap with the threads that the tap is cutting on the nut being operated upon, as will hereinafter more fully appear. The upward movement of the spindle is effected entirely by the said screw K, and the arrangement of parts is such that upon the completion of the tapping of a nut the aforesaid collar or shoulder $D^3$ shall come into engagement with the upper end of the said screw, that is thereupon or simultaneously with the said engagement reciprocated upwardly or in the direction required to push upward upon the said shoulder or collar and thereby elevate the spindle to the extent required to cause the said collar or shoulder to come into engagement with portion I³ of lever I² and thereby actuate the said lever and the pawl carried thereby as required to give the ratchet-wheel the desired fractional turn. In the case illustrated the ratchet-wheel has sixteen teeth, and each fractional turn of the wheel moves the latter the distance of two teeth, and consequently eight intermittent actuations of the said wheel are required after the last actuation of lever G for the purpose of operatively disconnecting gear C from spindle D after the number of nuts that are capable of being held upon the tap's shank have been threaded before the member $h$ of the ratchet-wheel is again brought into engagement with the said lever after operative engagement has again been established between the said gear and spindle.

To render the matter now being described more clear, I would remark that the spindle and its tap are in their elevated position preparatory to the tapping of a nut and are reciprocated downwardly preparatory and during the operation upon the nut that is next to be tapped and are again elevated into the said position when the last-mentioned nut has been tapped; that the ratchet-wheel K is given a fractional turn upon each upward reciprocation of the said spindle; that when the tap has accumulated as many nuts as its shank is capable of holding the last upward reciprocation of the tap that follows the said accumulation results in the operation of lever G by member $h$ of the ratchet-wheel and thereby disconnects gear C and the spindle, whereupon the said nuts are removed from the tap's shank; that operative connection between the said spindle and gear is again established preparatory to the commencement of the operation of the machine upon another series of nuts that are to be tapped and accumulated in the same manner; that in the position of the parts shown in Fig. I, that shows the extent to which the ratchet-wheel has been actuated upon the accumulation of three nuts by the tap, the tap is ready to descend into the fourth nut that is to be tapped; that the shank of the tap, when the ratchet-wheel has sixteen teeth and is turned two teeth at a time, should be long enough to render it capable of accumulating eight nuts, and that the return movement of the pawl after the latter's actuation of the ratchet-wheel is for the purpose of insuring that the said pawl shall actuate the ratchet-wheel an equal distance during each of its operations, limited by a stop that comprises, preferably, a screw L, that has its shank extending through a correspondingly-threaded hole in a lug A³, formed upon the standard A, and has its head arranged lowermost and in position to be engaged by an arm I⁴ of lever I² upon the said return movement of the pawl, and I would remark, furthermore, that the pawl-bearing portion of the said lever should be heavier than the said arm I⁴, or a suitably-applied spring acting in the direction to retain the pawl in the latter's normal position should be provided. The tap is removably secured within the tap-holder $d$ in any approved manner, and the nut that is being tapped is held stationary and in line with the path of the tap during the tapping operation within the nut-holder O, that consists, preferably, of any approved form of socket that is suitably shaped internally to hold the nut stationary during the tapping operation and that has its bottom perforated, as at O′, to accommodate the location and operation of the tap and that is open at one end—its mouth or receiving end—that is in open relation with the inclined feed-trough P, down which the nuts which are to be tapped are fed by gravity or otherwise.

Feed-screw K being of the double-feed variety, the same having a right-handed and left-handed spiral groove, is adapted to feed spindle D in opposite directions alternately, as will hereinafter more clearly appear. The pitch of the screw K is of course much greater than the pitch of the tap, and consequently it is obvious that screw K, when it is operatively engaged by a relatively stationary tooth or thread, will be reciprocated much more rapidly than the spindle can be actuated by the engagement of the threads of the tap with the threads of the nut-blanks being tapped.

R designates the relatively stationary thread or tooth that is instrumental in the operation of screw K and is formed upon an oscillating shaft R′, that has bearing in a box A², formed upon the standard A. A suitably-applied spring (not shown) can, if desired, be employed to act to retain the said shaft and its members in their normal position. Said shaft, adjacent to the said tooth or thread R, is provided with a laterally-projecting arm R², and the screw K above its threaded portion is provided with an annular recess K′. The screw K is operatively and slidably mounted upon spindle D, preferably by the well-known means of groove and feather, and the feather K³ is in the case illustrated formed upon or rigid with the screw, and the groove D³, that is engaged by the said feather, is formed in the spindle and is long enough to accommodate the operation of the parts independently of each other. Means are provided also for causing the spindle to reciprocate with the screw preparatory to the commencement and after the completion of the tapping operation, and the said means comprises, preferably, a horizontally-arranged block Q, placed within a horizontally-arranged chamber K², formed in one side of spindle D, and acted upon by a spring Q′, confined within said chamber at the inner end of the said block. The said chamber is open at its outer end, and the spring acts to push the block against the opposing surface of the screw and frictionally connect the two, and this operative connection is sufficient to cause the spindle to reciprocate in unison with the screw, but inadequate to prevent said frictional operative connection from yielding to that feed of the spindle that is occasioned by the engagement of the threads of the tap with the threads of the nut-blank that is operated upon.

The arrangement of parts is such that when the screw K is in its lowermost position the thread or tooth R shall be in its normal position and engage the said recess K' and shall be in position to be actuated into an operative position relative to that spiral groove of the screw that is instrumental in effecting the upward reciprocation of the screw, and the arm R² of the shaft R' normally protrudes into the lower portion of the path of shoulder or collar D³ that, as soon as the tap has passed through the nut, shall actuate the said shaft-arm R², and thereby oscillate the shaft in the direction and to the extent required to bring its tooth or thread R into operative engagement with the aforesaid spiral groove. The actuation of thread or tooth R into operative position relative to screw K results in the upward reciprocation of the said screw, and consequently in the upward or return movement of the tap. Figs. I and III show member R in operative engagement with screw K. As already indicated, the upper or return movement of the tap is effected by the engagement of the upper end of screw K with shoulder or collar D³.

By the construction hereinbefore described the spindle is lowered comparatively rapidly—that is, in unison with the downward movement of the screw K—before the tap has commenced to operate upon the nut-blank; but as soon as the tap has commenced its operation the means that establishes frictional operative connection between the screw and the spindle yields to the feed occasioned by the engagement of the threads of the tap and nut. The arrangement of the threads or grooves that are instrumental in the formation of the double-feed screw is the same as is found in double-feed screws generally, and in the case illustrated is such that the screw shall commence to lower as soon as ratchet-wheel H has actuated upon the upward reciprocation of the screw.

What I claim is—

1. In a nut-tapping machine, the combination with the suitably-rotated and suitably-supported tap-carrying spindle capable of reciprocation; of a double-feed screw operatively and slidably mounted upon said spindle, a relatively stationary thread or tooth for operatively engaging the said screw, and means for causing the spindle to move endwise with the screw but capable of yielding to the feed occasioned by the engagement of the tap with the threads being cut in the nut-blank, substantially as and for the purpose set forth.

2. In a nut-tapping machine, the combination with the suitably-rotated tap-carrying spindle capable of reciprocating, and a double-feed screw slidable upon the said spindle and having such operative connection with the spindle as to accommodate the reciprocation of the spindle independently of the reciprocation of the screw; of a suitably-supported oscillating shaft provided with a thread or tooth having the arrangement required to render it capable of being actuated into an operative position relative to the aforesaid screw, and the said shaft being provided with a laterally-projecting arm, and a member formed upon or rigid with the spindle and arranged in the position required to engage the said arm during the reciprocation of the spindle, substantially as and for the purpose specified.

3. In a nut-tapping machine, the combination with the suitably-rotated tap-carrying spindle provided with the shoulder or collar D³, the nut-holder O perforated to accommodate the location and operation of the tap, and the inclined feed-trough P communicating with the nut-holder; of the double-feed screw K operatively and slidably mounted upon the spindle, means arranged within the spindle and bearing outwardly upon the screw and thereby establishing frictional operative connection between the screw and spindle, and the oscillating shaft provided with the tooth or thread R and the laterally-projecting arm R², all arranged and operating substantially as shown, for the purpose specified.

4. In a nut-tapping machine, the combination with the tap-carrying spindle, a suitably-driven driving-wheel loosely mounted upon the spindle, a clutch for controlling operative connection between the said wheel and the spindle, and the clutch-operating lever; of an intermittently-rotated wheel provided with a projecting member arranged to engage and actuate the said lever once during every complete rotation of the wheel, means for actuating the said wheel or intermittently-rotated member upon the return or idle strokes of the spindle, substantially as and for the purpose specified.

5. In a nut-tapping machine, the combination with the tap-carrying spindle having the collar or shoulder D³, the suitably-driven driving-wheel loosely mounted upon the spindle, a clutch for controlling operative connection between the wheel and the spindle, and the clutch-operating lever; of the ratchet-wheel H provided with a projecting member h, the tilting lever I² bearing a pawl I and having a member extending into the path of the aforesaid shoulder or collar, all arranged and operating substantially as shown, for the purpose specified.

6. In a nut-tapping machine, the combination with the tap-carrying spindle, a driving-wheel loosely mounted upon the said spindle, a clutch for controlling operative connection between the said clutch and the spindle, and the clutch-operating lever; of the ratchet-wheel H provided with the projecting member $h$, the suitably-supported lever $I^2$ provided with the pawl I, the arm $I^4$, and the member $I^3$ normally projecting into the path of the aforesaid shoulder or collar, and the stop L, all arranged and operating substantially as shown, for the purpose specified.

In testimony whereof I sign this specification, in the presence of two witnesses, this 11th day of October, 1897.

JOSEPH A. COSTELLO.

Witnesses:
C. H. DORER,
ELLA E. TILDEN.